US008190439B2

(12) United States Patent
Block et al.

(10) Patent No.: US 8,190,439 B2
(45) Date of Patent: May 29, 2012

(54) METHOD FOR PREPARING INFORMATION FOR A SPEECH DIALOGUE SYSTEM

(75) Inventors: Hans-Ulrich Block, München (DE); Manfred Gehrke, Gilching (DE); Stefanie Schachtl, Alling (DE)

(73) Assignee: Svox AG (CH)

( * ) Notice: Subject to any disclaimer, the term of this patent is extended or adjusted under 35 U.S.C. 154(b) by 932 days.

(21) Appl. No.: 12/223,796

(22) PCT Filed: Oct. 25, 2006

(86) PCT No.: PCT/EP2006/067762

§ 371 (c)(1),
(2), (4) Date: Aug. 8, 2008

(87) PCT Pub. No.: WO2007/090473

PCT Pub. Date: Aug. 16, 2007

(65) Prior Publication Data

US 2010/0161331 A1 Jun. 24, 2010

(30) Foreign Application Priority Data

Feb. 10, 2006 (DE) ........................ 10 2006 006 305

(51) Int. Cl.
*G10L 15/00* (2006.01)

(52) U.S. Cl. ................ 704/275; 704/254; 707/4; 707/5

(58) Field of Classification Search ................. 704/254, 704/275; 707/4, 5
See application file for complete search history.

(56) References Cited

U.S. PATENT DOCUMENTS 6,035,285 A * 3/2000 Schlect et al. ................. 705/30
6,859,777 B2 2/2005 Krasle
2003/0014255 A1* 1/2003 Steingrubner et al. ........ 704/270
2004/0176954 A1* 9/2004 Wang ............................ 704/254
2007/0050340 A1* 3/2007 von Kaenel et al. .............. 707/3

FOREIGN PATENT DOCUMENTS

DE 100 12 572 9/2001
EP 1 455 268 9/2004

OTHER PUBLICATIONS

Hu J. et al., "A System for Understanding and Reformulating Tables," Internatioanl Association for Pattern Recognition Workshop on Document Analysis System, Dec. 2000, pp. 361-372.

Pivk, A. et al, "Transforming Arbitrary Tables Into F-Logic Frames with TARTAR," Elsevier Science, Aug. 4, 2005, pp. 1-44.

Bianchi, D. et al. "Ontology Based Automatic Speech Recognition and Generation for Human-Agent Interaction," 13$^{th}$ IEEE International Workshops on Enabling Technologies, Jun. 14, 2004, pp. 65-66.

Cimiano, P., Translating Wh-Questions Into F-Logic Queries, Proceedings of the Colognet-Elsnet Workshop on Questions and Answers, Dec. 2003, pp. 130-137.

A. Joshi, et al., "Tree-Adjoining Grammars," Handbook of Formal Languages, vol. 3, 1997, pp. 69-124.

* cited by examiner

*Primary Examiner* — Daniel D Abebe

(74) *Attorney, Agent, or Firm* — Sunstein Kann Murphy & Timbers LLP

(57) ABSTRACT

In many application environments, it is desirable to provide voice access to tables on Internet pages, where the user asks a subject-related question in a natural language and receives an adequate answer from the table read out to him in a natural language. A method is disclosed for preparing information presented in a tabular form for a speech dialogue system so that the information of the table can be consulted in a user dialogue in a targeted manner.

29 Claims, 2 Drawing Sheets

FIG 2

Countries in Europe

| | | |
|---|---|---|
| Country | France | Italy |
| Capital | Paris | Rome |
| Area | 544,000 sq. km | 301,336 sq. km |
| Population | 58,850,000 | 57,590,000 |
| National symbol | Rooster | Sun |

201
202
203
204
205

208 207 206

METHOD FOR PREPARING INFORMATION FOR A SPEECH DIALOGUE SYSTEM

CROSS REFERENCE TO RELATED APPLICATIONS

This application is based on and hereby claims priority to International Application No. PCT/EP2006/067762, filed on Oct. 25, 2006, and German Application No. 10 2006 006 305.8, filed on Feb. 10, 2006, the contents of both of which are herein incorporated by reference.

BACKGROUND

The embodiments discussed herein relate to a method, a device and a system for editing information for a speech-dialog system.

Information is presented on websites in multifarious forms and can be viewed by users via graphical user interfaces. One possible form of presentation is a table in which information is displayed as an ordered compilation in text or data form. The information being presented is therein organized into rows (horizontal lines) and columns (vertical lines) in such a way that there is generally a semantic and/or syntactic correlation between the contents of the table elements in a row or column.

What is problematic therein is that information thus presented can be utilized by a user only via graphical user interfaces, which, however, in certain usage scenarios is not or only conditionally possible. This will be the case, for example, during a car journey if the user wishes to read information presented on a website in tabular form via an internet access. It is therefore desirable to provide speech access to tables on websites via which access the user can ask a topic-related question using natural language and receive the appropriate answer read out in natural-language form.

A method for navigating to websites via a voice control is described in U.S. Pat. No. 6,859,777 B2. For that purpose, the vocabulary of a speech recognition device is dynamically generated from the cross-references (links) found on a website. The links can then be spoken by the user to navigate to another site. The other content-related information to be found on the website is not, though, included by that method. Thus it is, in particular, not possible for a user to selectively interrogate the information presented on the website in tabular form in a speech-dialog system, with the required information thereupon being output by the speech-dialog system.

SUMMARY

It is an aspect of the embodiments thus to provide a method, a device and a speech-dialog system for editing information for a speech-dialog system by which information presented in tabular form can be selectively interrogated by a user.

The aspect is achieved by a method, a device and a speech-dialog system having the features discussed herein.

Information presented in tabular form is inventively provided by a method for editing information for a speech-dialog system. The information presented in tabular form and/or its representation is/are standardized in accordance with predefined criteria and accessibly stored. Horizontal and/or vertical rows of table elements are furthermore assigned a first grammar and the table elements from the respective row a second grammar. The first and second grammars describe structural and conceptual rules for spoken inputs by which the assigned row and the assigned table elements of the respective row can be recognized. The information presented in tabular form has been edited for a speech-dialog system on the basis of the assigned first and second grammar. The method has the advantageous effect that a conversion for a speech-dialog system is generated fully automatically from internet-based applications that have been implemented in accordance with specific guidelines. Thus, it is possible, for example, to generate semiautomatic help systems that can be accessed via speech from lists of FAQs (Frequently Asked Questions) that are available on the internet. With the aid of a convenient speech-dialog application the method will further enable providers to draw attention to their offerings on the internet without having to invest for that purpose in a separate, specially made speech-dialog engine. Thus, for example, a car driver can, while on the road obtain details of the nearest gas station or service area if that information has been appropriately supplied by the providers in a table on the internet, and the information edited by the method can be used within the vehicle by a speech-dialog system.

According to a development of the embodiments the information presented in tabular form is ascertained from at least one predefinable database. It is thus advantageously possible for internet addresses predefined by the method to be visited and for those sites to be searched for HTML table objects.

According to a further embodiment a horizontally oriented table has headings in a first column. A pre-specifiable criterion for standardizing the ascertained information presented in tabular form is a horizontally oriented table. This utilizes the knowledge that the presence of heavy type in the first row as compared with standard type in the others will provide a strong indication that the first row contains headings. It is thus advantageously possible for the tables that have been found to be presented having the same orientation. Thus, for example, it is also within the scope of the present invention to fold out multi-dimensional or nested tables according to a predefined scheme such that they will then have the same orientation and hence be comparable.

According to a further embodiment a predefined criterion for standardizing the ascertained information presented in tabular form is a normalization of the written presentation of the information. This has the advantage, for example, that abbreviations will be resolved or normalized, that any special characters appearing in the text section such as, for example, periods in abbreviations or points used for marking ordinal numbers in some language notations will be replaced in accordance with predefined heuristics with defined alphanumeric strings, and that unknown characters will be replaced with blanks. This approach has the advantage that the information presented in tabular form will be uniform and hence comparable.

According to a preferred embodiment, table elements are each assigned to at least one class and a class is assigned to horizontal and/or vertical rows of table elements as a function of the assigned classes and standardized information. The first and second grammars are ascertained with the aid of the assigned classes. The grammars are therein ascertained with the aid of the assigned classes in particular from a database. This development has the advantageous effect that tables in the case of which the generated grammars or standard grammars ascertained from a database cannot be used will also be edited for a speech-dialog application.

According to a further advantageous embodiment the classes requiring to be assigned comprise syntactic, semantic and standard classes. Syntactic classes are therein, for example, dates, times of day, and measurement data of any kind. Semantic classes are, for example, ontologies comprising lists of elements belonging to a specific semantic class. If it has not been possible to allocate a suitable syntactic or semantic class then what is termed a standard or default class will be assigned.

According to a further advantageous embodiment, default outputs that output the edited information in a speech-dialog system in a context-dependent manner are provided for speech synthesis. The default outputs include, for example, start notifications, system outputs, and response outputs. Depending on the speech-dialog system's specific status, predefined default statements or default statements compiled using edited information can be output for the users by a speech synthesis system.

According to the device for editing information for a speech-dialog system the device provides information presented in tabular form. It furthermore standardizes the information presented in tabular form and/or its representation in accordance with predefined criteria and a means for accessibly storing it/them. The device furthermore assigns a first grammar to horizontal and/or vertical rows and a second grammar to the table elements from the respective row, the first and second grammars describing structural and conceptual rules for spoken inputs on the basis of which the assigned row and the assigned table elements of the respective row can be recognized. The information presented in tabular form will thus have been edited for a speech-dialog system on the basis of the assigned first and second grammars.

Accordingly, the speech-dialog system for the interrogability of information presented in tabular form in a speech dialog, the speech-dialog system has the following components:

a speech recognition unit for recognizing requests made by a user, a dialog engine for ascertaining information that is presented in tabular form and has been requested by users, and a speech synthesizing unit for outputting the requested information.

BRIEF DESCRIPTION OF THE DRAWINGS

These and other aspects and advantages will become more apparent and more readily appreciated from the following description of the exemplary embodiments, taken in conjunction with the accompanying drawings of which:

The subject matter will be explained in more detail below with the aid of exemplary embodiments and with reference to the drawings, in which:

FIG. 2 is a standardized table containing information about countries in Europe.

DETAILED DESCRIPTION OF THE PREFERRED EMBODIMENT

Figure 1:
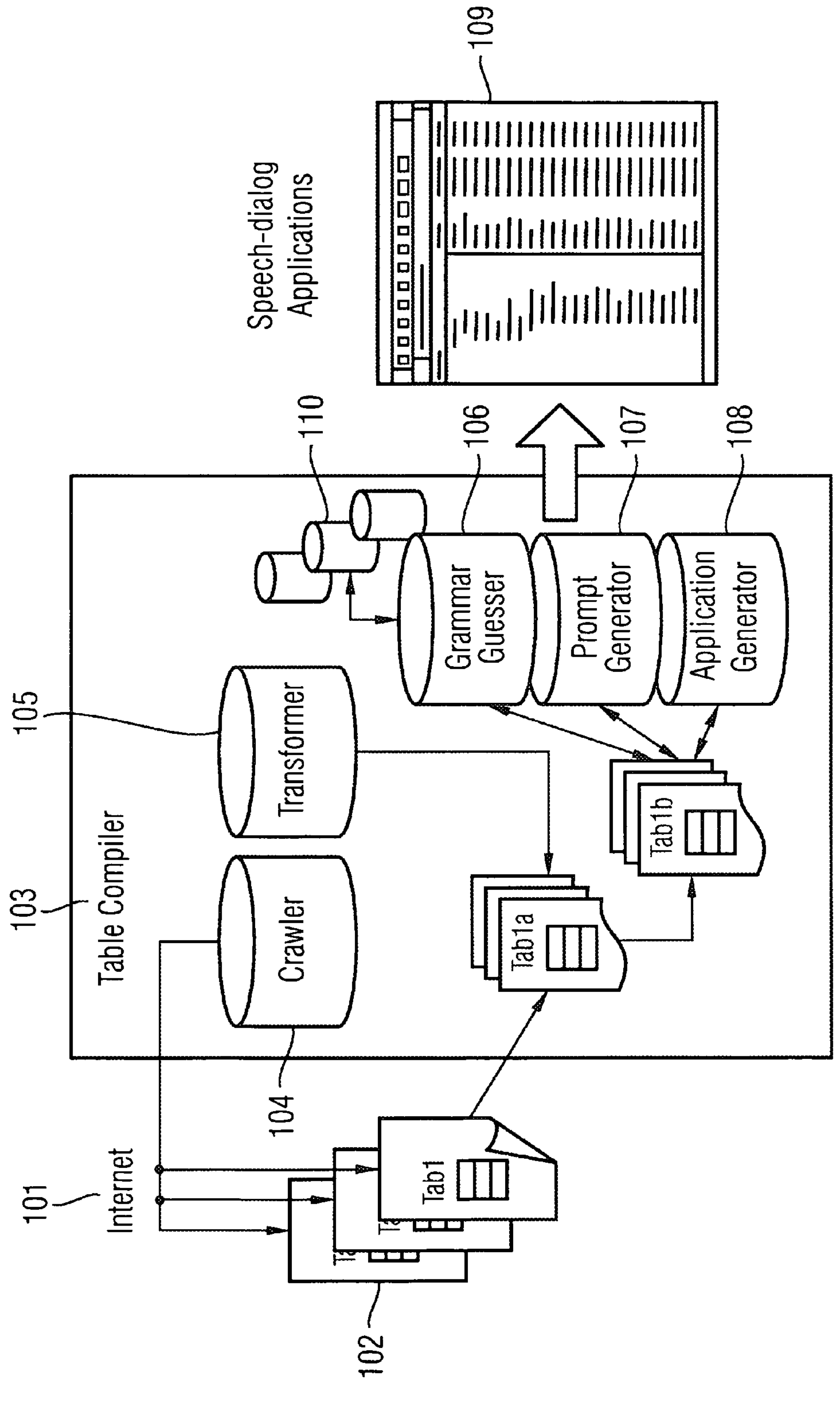
FIG. 1 is a schematic of a method for editing information presented in tabular form for a speech-dialog system.

Reference will now be made in detail to the preferred embodiments, examples of which are illustrated in the accompanying drawings, wherein like reference numerals refer to like elements throughout.

FIG. 1 is a schematic of a method for editing information 102 that has been found on the internet 101 and is presented in tabular form for a speech-dialog system 109. Tables on the internet 101 are for that purpose searched by a table compiler 103 and edited for the speech-dialog application 109. The internet is first searched by a table crawler 104 for HTML tables, which are then checked for usability, with those that are usable being filed locally. A table transformer 105 standardizes how the usable tables are presented and the respective textual table elements. For the table contents, a grammar guesser 106 ascertains on the basis of a suitable database 110 the appropriate grammars from which the speech models are then generated for the speech recognition device of the speech-dialog system 109. A prompt generator 107 generates all the outputs necessary for the application from the table's contents and, where applicable, heading. The results of the table transformer 105, grammar guesser 106, and prompt generator 107 are assembled in an application generator 108 in a predefined data structure into the desired speech-dialog application so that the table itself is transformed into a logical data structure on which the relevant requests can be evaluated. When the system is operating, a dialog engine 109 will recognize the user's requests expressed in free, natural-language form, translate them into a table request, and finally output the solution found using natural language.

The individual components of the inventive method that are shown in FIG. 1 are described again in detail below. Immediately on being launched the table crawler 104 begins to successively visit the internet addresses predefined in a list, for example http://www.sportl.de and http://www.koeln.de. It follows the links within what has been specified and searches all the sites for HTML objects framed according to the HTML table format by <table> and </table>. The tables found are checked automatically for usability, for example to determine whether their table elements contain sufficient text. The orientation of the tables is then determined based on various heuristics. For example, heavy type in the first column as compared with standard type in the others will provide a strong indication that the first column contains headings, meaning that the table is horizontally oriented. Conversely, heavy type in the first row and standard type in the others will indicate a vertically oriented table. If a table is multi-dimensional, which is often so in the case of, for instance, distance tables, it will be opened out in accordance with a predefined scheme. Nested tables, meaning tables within tables, will likewise be folded out in a suitable manner.

The tables that have been found and accessibly stored are then standardized by the table transformer 105. To that end, a vertically oriented table, for example, will be transformed into a horizontally oriented table. Abbreviations will furthermore be resolved or normalized and any special characters appearing in the text section such as, for example, periods in abbreviations or points used for marking ordinal numbers in some language notations will be replaced in accordance with predefined heuristics with defined alphanumeric strings. Any unknown characters will furthermore be replaced with blanks. All tables that have been found and accessibly stored are treated likewise.

The application-specific vocabulary via which the user can access the values of the table elements through a dialog is ascertained for the speech recognition device in an ensuing step by a grammar guesser 106. For this purpose, each table element of the standardized table is assigned a class. There are syntactic and semantic classes. Syntactic classes are, for example, dates, times of day, and measurement data of any kind. If the text in a table element is, for example, a cardinal number followed by "square km", that table element will be assigned the class "unit of square measure". Semantic types are determined by way of ontologies. A database with an expandable set of ontologies is thus available to the method. The ontologies are simple lists of all the elements belonging to a specific semantic class. For example the ontology for "all countries in the world" is a list of all countries in the world beginning with Afghanistan and ending [in German] with Cyprus. Assigning then takes place through simple correlation of the text in the relevant table element with the lists. The relevant table element contains all the semantic classes in whose ontology the text of the relevant table element occurs. For example, the table element with the text "France" would be assigned the class "all countries in the world" and "all countries in Europe".

The row's class is then determined. For this purpose, the classes of the individual table elements in the row are collected and the most probable class for the entire row determined on the basis of various heuristics. For example, a row with the table elements "France" and "Italy" would be assigned the class "all countries in Europe" because that is the smallest class assigned to most of the table elements of the row. If a table element or row could not be allocated either a syntactic or a semantic class it will be assigned a predefined default or standard class.

With this process completed and each row in the table having been uniquely allocated a class, the grammars necessary for the speech-dialog system's speech model are ascertained. For this purpose, the table compiler has a further database of grammars. The grammars describe word strings which a user would employ during a free dialog when wishing to know something about a specific topic. The word strings do not describe whole sentences but only parts of utterances. For example, in the user utterance "how big is France?" the word string "how big" would be described by a first grammar and the word string "France" by a second grammar. The grammars of the table compiler differ principally according to whether what is concerned is the question about a value or the filter for a value. Questions about a value are referred to below as trigger grammars and filters for values as filter grammars. Trigger grammars supply as a trigger value a placeholder which is replaced in the evaluation with the respective heading of the row. Filter grammars yield, as their result, a filter value that is compared with the standardized entries in the table elements. The filter grammars are in part simple word lists corresponding substantially to the lists of the ontologies. For example, a filter grammar containing the names of all the world's countries also in their variant forms is provided for all countries in the world. Thus, for example, the word strings "United States of America", "United States", and "USA" all yield the same value "USA". All entries of, for example, "United States" in the table elements are likewise standardized to the value "USA". Another part of the filter grammars describes word strings such as, for example, "three hundred thousand square kilometers" that are used for numeric values. These are the filter grammars for measurements, date, time of day etc. Constituting a further part of the filter grammars are the word strings for comparative constructions such as, for instance, "more than three hundred thousand square kilometers" or "the biggest". There are, moreover, also filter grammars that describe comparative constructions of the table elements among each other, for example for utterances such as "what country is bigger than Italy?". Provided therefor is a special formalism that inserts a placeholder to which the comparison expression is linked and which is replaced accordingly in the actual utterance.

The specific grammars best suited to the respectively current application are selected from the database of grammars. Various heuristics are employed therefor that take account of the row's class, its heading and, in the case of numeric values, its minimum and maximum. Each row is hence assigned a trigger grammar and a filter grammar.

In order to minimize the total vocabulary for the speech recognition device it can furthermore be provided for numeric values in the filter grammars to be limited to expedient rounded-off values.

Default grammars are generated for rows allocated the default class. As the default trigger grammar the row's heading is taken and a "which" placed in front of it. The table elements of the relevant row are taken as the default filter grammar.

In this way, the grammar guesser supplies a set of trigger and filter grammars for each application which in their totality describe what the user is able to find out via the respective table in a free dialog.

The prompts or, as the case may be, statements for the application are generated in an ensuing step by the prompt generator. Three types of prompts are therein provided: the start-message prompts, system prompts, and response prompts. The start-message prompt serves to inform users of the topics from the internet about which they are able to talk within the application. The system informs the user, for instance, by the following start-message prompt that: "A new table has been found of countries in Europe. It contains information about each country and its capital city, total area, and national symbol." The start-message prompt is generated automatically by prefixing the table heading "Countries in Europe" with "I have found a new table of". According to German word order, when needed, the row headings can be prefixed with "gefunden (=found) It contains information about", after which the individual row headings are listed separated by commas and a concluding "and". The start-message prompt will be generated appropriately differently if a table does not have a heading.

The system prompts are played back in general dialog situations, for example when the user's utterance has not been understood or if a help function has been called up by the user.

In this exemplary embodiment the response prompt has two functions: On the one hand it indirectly confirms what the user has said or, as the case may be, what the speech recognition device has understood; on the other hand it answers the question. For example the user asks "what is the capital of France?", whereupon the system responds with the response prompt "I have found the following answer to your question about the capital, France: Paris". The response prompt is generated through the filter values recognized by the filter grammars first being filed as filters, in this example the filter value "France". A trigger grammar is likewise filed, as in this example: "what is its capital?". A data structure is then built up from the filed trigger grammar and filter grammar and sent as a request to the application with its stored, edited tables. The result value received, the trigger value and the filter value are then verbalized so that the above-described answer can be output. There are suitable standard prompts for verbalizing the values so that, for example, "fifty-seven million five hundred ninety thousand" will be read out and not "five seven five nine zero zero zero zero". Thus, for each application the prompt generator 107 supplies a set of prompts presenting the contents of the application to the user, reacting to standard situations, and presenting the answers found using natural language.

The data structures generated by the grammar guesser 106 and prompt generator 107 are assembled in the application generator 108 into a structure that can be used by the speech-dialog application. The application is first given a name corresponding to the table heading or, as the case may be, help constructions if the table heading cannot be identified. A directory is created under the name and a configuration file generated. Four subdirectories are generated in the application directory that comprise a subdirectory containing the description of the dialog flow as well as the prompts, a subdirectory containing the descriptions for accessing the background system, in this case, the table suitably edited as the data structure, a subdirectory in which the grammars are located, and a subdirectory in which the speech models generated therefrom are located. The speech-dialog application is fully described by the data structure and can be loaded onto the desired speech platform such as, for example, a PDA or a vehicle's head unit.

The speech-dialog system 109 includes generally of a speech recognition unit, a speech synthesizing unit, and a dialog engine. Presented below with reference to FIG. 2 are some dialog sequences that can be executed by a speech-dialog system based on the speech-dialog applications generated by the table compiler shown in FIG. 1.

1. "What Do You Know About France?"

In this case, a filter value is interrogated so that all the table elements of the column in which France is located 207 will be read out (Paris, 544,000 square km, 58,850,000, rooster).

2. "What Capitals are There in Europe?"

In this case, a trigger value is interrogated so that all the table elements of the row with the heading capital 202 will be read out (Paris, Rome).

3. "What is the Capital of Italy?"

In this case, a trigger value and a filter value are interrogated so that the table element appearing at the interface of the row capital 202 and the column Italy 206 (Rome) will be read out.

4. "How Big is Italy and What is its Capital?"

In this case, two different trigger values and one filter value are interrogated so that the table element appearing at the interface of the row capital 202 and the column Italy 206 will be read out and the table element appearing at the interface of the row area 203 and the column Italy 206 (301,336 square km, Rome) will be read out.

5. "What Do You Know About Paris?"

In this case, a filter value is interrogated so that the table elements of the entire column Paris 207 will actually be read out at that point. A restriction is, though, expediently applied so that only the table element appearing at the interface of the reference row country 201 and the column Paris 207 (France) will be read out here.

6. "What Do You Know About Countries in Europe?"

In this case, neither a filter value nor a trigger value will be interrogated so that the entire table will actually be read out at that point. A restriction is, though, expediently applied so that only the table elements of the reference row country 201 will be read out and the system will in this case terminate with "etc." (France, ItPaly, etc.).

The present invention is not limited to the exemplary embodiments described herein.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A device for editing information for a speech-dialog system, comprising:

means for providing information presented in tabular form, means for standardizing the information presented in tabular form and/or its representation in accordance with predefined criteria and a means for accessibly storing it/them, means for assigning a first grammar to horizontal and/or vertical rows and a second grammar to the table elements from the respective row, the grammars describing structural and conceptual rules for spoken inputs by means of which the assigned row and the assigned table elements of the respective row can be recognized so that the information presented in tabular form has been edited for a speech-dialog system on the basis of the assigned first and second grammars.

2. A computer-implemented method for providing speech access to a table of data, the table comprising a plurality of elements organized as a plurality of horizontal rows of the elements and a plurality of vertical columns of the elements, each element storing respective element contents, the method comprising:

reading the contents of the plurality of elements;

automatically defining a first speech-recognition grammar corresponding to the plurality of elements of the table, wherein the first speech-recognition grammar is defined based at least in part on the contents of the respective elements of the table; and automatically defining a second speech-recognition grammar corresponding to the plurality of rows of the table, wherein the second speech-recognition grammar is defined based at least in part on the contents of the elements of the respective rows of the table.

3. A method according to claim 2, wherein defining the second speech-recognition grammar comprises, for each row, defining a trigger grammar and a filter grammar.

4. A method according to claim 2, further comprising automatically:

ascertaining orientation of the table, wherein the orientation comprises one of horizontal and vertical; and if the table is determined to be vertically oriented, transforming the table into a horizontally oriented table.

5. A method according to claim 4, where ascertaining the orientation of the table comprises ascertaining the orientation of the table based at least in part on character formatting of the contents of at least two of the elements of the table.

6. A method according to claim 2, further comprising automatically:

for each element, assigning at least one class to the element, wherein each of the at least one class is assigned to the element based at least in part based on the contents of the element; and for each row, assigning a class to the row, wherein the class is assigned to the row based at least in part on the classes assigned to the elements of the row.

7. A method according to claim 6, wherein defining the second speech-recognition grammar comprises, for each row, defining a trigger grammar and a filter grammar based at least in part on the class of the row.

8. A method according to claim 6, wherein defining the second speech-recognition grammar comprises, for each row, defining a trigger grammar and a filter grammar based at least in part on the class of the row and headings of the row.

9. A method according to claim 6, wherein defining the second speech-recognition grammar comprises, for each row, defining a trigger grammar and a filter grammar based at least in part on the class of the row, headings of the row and minimum and maximum values of the contents of elements of the row.

10. A method according to claim 6, wherein assigning the at least one class to the element comprises:
   comparing the contents of the element to contents of a plurality of predefined lists of words, each of the predefined list of words corresponding to a respective predefined class; and
   if the contents of the element correspond to a word in one of the predefined lists of words, assigning the class corresponding to the list to the element.

11. A method according to claim 10, wherein assigning the at least one class to the element further comprises:
   if the contents of the element do not correspond to a word in any of the predefined lists of words, assigning a default class to the element.

12. A method according to claim 10, wherein assigning the class to the row comprises:
   assigning to the row a class selected from a plurality of possible classes, the plurality of possible classes comprising the classes assigned to the elements of the row, wherein the assigned class simultaneously optimizes at least two criteria, including:
      (a) the class is assigned to as large a number of the elements in the row as possible; and
      (b) the predefined list of words corresponding to the class has as small a number of words as possible.

13. A method according to claim 2, further comprising automatically normalizing the contents of at least a portion of the elements of the table.

14. A method according to claim 2, wherein reading the contents of the plurality of elements comprises reading contents of at least a portion of a web page.

15. A method according to claim 2, further comprising:
   generating a structure from the first speech-recognition grammar and the second speech-recognition grammar; and
   providing the generated structure to a speech-dialog application.

16. A system for providing speech access to a table of data, the table comprising a plurality of elements organized as a plurality of horizontal rows of the elements and a plurality of vertical columns of the elements, each element storing respective element contents, the system comprising:
   a table transformer configured to read the contents of the plurality of elements; and
   a grammar guesser coupled to the table transformer and configured to:
      automatically define a first speech-recognition grammar corresponding to the plurality of elements of the table, wherein the first speech-recognition grammar is defined based at least in part on the contents of the respective elements of the table; and
      automatically define a second speech-recognition grammar corresponding to the plurality of rows of the table, wherein the second speech-recognition grammar is defined based at least in part on the contents of the elements of the respective rows of the table.

17. A system according to claim 16, wherein the grammar guesser is configured to automatically define, for each row, a trigger grammar and a filter grammar.

18. A system according to claim 16, wherein the table transformer is configured to automatically:
   ascertain orientation of the table, wherein the orientation comprises one of horizontal and vertical; and
   if the table is determined to be vertically oriented, transform the table into a horizontally oriented table.

19. A system according to claim 18, where the table transformer is configured to ascertain the orientation of the table based at least in part on character formatting of the contents of at least two of the elements of the table.

20. A system according to claim 16, wherein the grammar guesser is configured to automatically:
   for each element, assign at least one class to the element, wherein each of the at least one class is assigned to the element based at least in part based on the contents of the element; and
   for each row, assign a class to the row, wherein the class is assigned to the row based at least in part on the classes assigned to the elements of the row.

21. A system according to claim 20, wherein the grammar guesser is configured to define, for each row, a trigger grammar and a filter grammar based at least in part on the class of the TOW.

22. A system according to claim 20, wherein the grammar guesser is configured to define, for each row, a trigger grammar and a filter grammar based at least in part on the class of the row and headings of the row.

23. A system according to claim 20, wherein the grammar guesser is configured to define, for each row, a trigger grammar and a filter grammar based at least in part on the class of the row, headings of the row and minimum and maximum values of the contents of elements of the row.

24. A system according to claim 20, wherein the grammar guesser is configured to automatically:
   compare the contents of the element to contents of a plurality of predefined lists of words, each of the predefined list of words corresponding to a respective predefined class; and
   if the contents of the element correspond to a word in one of the predefined lists of words, assign the class corresponding to the list to the element.

25. A system according to claim 24, wherein the grammar guesser is configured to:
   if the contents of the element do not correspond to a word in any of the predefined lists of words, assign a default class to the element.

26. A system according to claim 24, wherein the grammar guesser is configured to:
   assign to the row a class selected from a plurality of possible classes, the plurality of possible classes comprising the classes assigned to the elements of the row, wherein the assigned class simultaneously optimizes at least two criteria, including:
      (a) the class is assigned to as large a number of the elements in the row as possible; and
      (b) the predefined list of words corresponding to the class has as small a number of words as possible.

27. A system according to claim 16, wherein the table transformer is configured to automatically normalize the contents of at least a portion of the elements of the table.

28. A system according to claim 16, wherein the table transformer is configured to read the table from contents of at least a portion of a web page.

29. A system according to claim 16, further comprising an application generator coupled to the grammar guesser and configured to:
   generate a structure from the first speech-recognition grammar and the second speech-recognition grammar; and
   provide the generated structure to a speech-dialog application.

* * * * *